(12) United States Patent
Wu (10) Patent No.: US 10,247,877 B2
(45) Date of Patent: Apr. 2, 2019

(54) BACKLIGHT MODULE AND A LIQUID CRYSTAL DISPLAY APPARATUS HAVING THE SAME

(71) Applicant: BOE TECHNOLOGY GROUP CO., LTD., Beijing (CN)

(72) Inventor: Zhongbao Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/543,522

(22) PCT Filed: Mar. 9, 2017

(86) PCT No.: PCT/CN2017/076132
§ 371 (c)(1),
(2) Date: Jul. 13, 2017

(87) PCT Pub. No.: WO2017/190548
PCT Pub. Date: Nov. 9, 2017

(65) Prior Publication Data
US 2018/0224594 A1 Aug. 9, 2018

(30) Foreign Application Priority Data

May 6, 2016 (CN) .......................... 2016 1 0298072

(51) Int. Cl.
*G02F 1/1333* (2006.01)
*G02F 1/1335* (2006.01)
*F21V 8/00* (2006.01)

(52) U.S. Cl.
CPC ......... *G02B 6/0088* (2013.01); *G02B 6/0055* (2013.01); *G02B 6/0065* (2013.01);
(Continued)

(58) Field of Classification Search
CPC ......... G02F 1/133308; G02F 1/133608; G02F 1/133317; G02F 1/133512
See application file for complete search history.

(56) References Cited

U.S. PATENT DOCUMENTS

2002/0080298 A1* 6/2002 Fukayama ........ G02F 1/133308
349/58
2008/0055518 A1* 3/2008 Jung .................... G02B 6/0055
349/67
(Continued)

FOREIGN PATENT DOCUMENTS

CN 1361446 A 7/2002
CN 101452150 A 6/2009
(Continued)

OTHER PUBLICATIONS

International Search Report & Written Opinion dated May 2, 2017 regarding PCT/CN2017/076132.
(Continued)

*Primary Examiner* — Jessica M Merlin
(74) *Attorney, Agent, or Firm* — Intellectual Valley Law, P.C.

(57) ABSTRACT

The present application discloses a backlight module including a light guide plate having a light emitting side and a rear side opposite to the light emitting side, and a plurality of lateral sides each of which connecting the light emitting side and the rear side, at least a first side of the plurality of lateral sides is a light incident side configured to receive light from a light source, and at least a second side of the plurality of lateral sides is not the light incident side; a light barrier attached to the second side and in contact with the second side for blocking light propagation, the light barrier fixedly positioned relative to the light guide plate; and a mold frame on a periphery of the light guide plate, the mold frame having at least one spacer. The light barrier includes at least one protruding support protruding away from an outer surface of the light barrier, the outer surface being on a side of the light barrier distal to the second side.

18 Claims, 5 Drawing Sheets

(52) U.S. Cl.
CPC ..... *G02B 6/0093* (2013.01); *G02F 1/133308* (2013.01); *G02F 1/133608* (2013.01); *G02F 2001/13332* (2013.01); *G02F 2001/133314* (2013.01); *G02F 2001/133317* (2013.01)

(56) References Cited

U.S. PATENT DOCUMENTS

| | | |
|---|---|---|
| 2009/0147174 A1 | 6/2009 | Ha et al. |
| 2009/0231509 A1* | 9/2009 | Hsu .................. G02F 1/133308 349/60 |
| 2010/0020261 A1* | 1/2010 | Oohira .............. G02F 1/133308 349/58 |
| 2012/0069261 A1 | 3/2012 | Lee et al. |

FOREIGN PATENT DOCUMENTS

| | | |
|---|---|---|
| CN | 103675988 A | 3/2014 |
| CN | 203686916 U | 7/2014 |
| CN | 105785498 A | 7/2016 |
| KR | 20110048320 A | 5/2011 |

OTHER PUBLICATIONS

Second Office Action in the Chinese Patent Application No. 201610298072.8, dated Oct. 31, 2018; English translation attached.

\* cited by examiner

FIG. 1

*Related Art*

BACKLIGHT MODULE AND A LIQUID CRYSTAL DISPLAY APPARATUS HAVING THE SAME

CROSS-REFERENCE TO RELATED APPLICATION

This application is a national stage application under 35 U.S.C. § 371 of International Application No. PCT/CN2017/076132, filed Mar. 9, 2017, which claims priority to Chinese Patent Application No. 201610298072.8, filed May 6, 2016, the contents of which are incorporated by reference in the entirety.

TECHNICAL FIELD

The present invention relates to display technology, more particularly, to a backlight module and a liquid crystal display apparatus having the same.

BACKGROUND

To a large degree, the settings of a liquid crystal module determine the brightness, contrast, color, and view angle of a liquid crystal display apparatus. The liquid crystal module is one of the key components of the liquid crystal display apparatus, including a backlight module and a liquid crystal display panel. The backlight module includes a light source for providing light to the liquid crystal display panel during image display.

SUMMARY

In one aspect, the present invention provides a backlight module comprising a light guide plate having a light emitting side and a rear side opposite to the light emitting side, and a plurality of lateral sides each of which connecting the light emitting side and the rear side, at least a first side of the plurality of lateral sides is a light incident side configured to receive light from a light source, and at least a second side of the plurality of lateral sides is not the light incident side; a light barrier attached to the second side and in contact with the second side for blocking light propagation, the light barrier fixedly positioned relative to the light guide plate; and a mold frame on a periphery of the light guide plate, the mold frame comprising at least one spacer; wherein the light barrier comprises at least one protruding support protruding away from an outer surface of the light barrier, the outer surface being on a side of the light barrier distal to the second side; and each of the at least one protruding support is configured to support one of the at least one spacer.

Optionally, the mold frame comprises at least one first recess in areas corresponding to the at least one protruding support, each of the at least one first recess configured to receive one of the at least one protruding support, each of the at least one first recess and a corresponding protruding support complementarily matching each other.

Optionally a thickness of each of the at least one first recess is substantially the same as that of a corresponding one of the at least one protruding support.

Optionally, the backlight module further comprises an optical film on the light emitting side of the light snide plate, the optical film comprising at least one first insert hole in a peripheral region of the optical film; wherein each of the at least one spacer comprises an insert configured to be engaged with one of the a least one first insert hole.

Optionally, the backlight module further comprises at least one laminate sheet on a side of the optical film distal to the light guide plate, each of the at least one laminate sheet comprising a second insert hole; wherein the insert is configured to be engaged with the second insert hole.

Optionally, the optical film further comprising at least one positioning lug; each of the at least one first insert hole extends through one of the at least one positioning lug; and each of the at least one positioning lug is configured to be disposed on one of the at least one spacer.

Optionally, the mold frame comprises at least one second recess in areas corresponding to the at least one positioning lug, each of the at least one second recess configured to receive one of the at least one positioning lug, each of the at least one second recess and a corresponding positioning lug complementarily matching each other.

Optionally, a thickness of each of the at least one second recess is substantially the same as that of a corresponding one of the at least one positioning lug.

Optionally, the backlight module further comprises at least one laminate sheet on a side of the optical film distal to the light guide plate, each of the at least one laminate sheet comprising a second insert hole; wherein each of the at least one laminate sheet is on a side of a corresponding one of the at least one positioning lug; each of the at least one first insert hole is aligned with a corresponding second insert hole in one of the at least one laminate sheet; and the insert is configured to be engaged with each of the at least one first insert hole and the corresponding second insert hole.

Optionally, the at least one protruding support comprises a plurality of protruding supports spaced apart from each other; and the at least one spacer comprises a plurality of spacers spaced apart from each other.

Optionally, the mold frame further comprises a plurality of connecting portions, each of which connecting two adjacent spacers, each of the plurality of connecting portions having a fifth side and a sixth side opposite to the fifth side, the fifth side being on a side of the sixth side proximal to the light emitting side; and the backlight module further comprises a double-sided adhesive tape on the fifth side.

Optionally, the backlight module further comprises a backplate on the rear side and configured to be engaged with the mold frame.

Optionally, the light barrier is adhered onto the second side.

Optionally, the light barrier is made of a metal material.

In another aspect, the present invention provides a liquid crystal display apparatus comprising the backlight module described herein; and a liquid crystal display panel on the light emitting side; wherein each of the at least one spacer is between the liquid crystal display panel and one of the at least one protruding support.

Optionally, the liquid crystal display apparatus further comprises a bezel configured to enclose the liquid crystal display panel and the backlight module.

Optionally, the bezel covers a peripheral region of the liquid crystal display panel.

In another aspect, the present invention provides a light barrier for blocking light propagation on a lateral side of a light guide plate that is not a light incident side, comprising at least one protruding support protruding away from an outer surface of the light barrier; wherein a thickness of each of the at least one protruding support is less than a maximum thickness of the light barrier.

In another aspect, the present invention provides a mold frame for assembling a light guide plate in a backlight module, comprising a plurality of spacers, a plurality of connecting portions each of which connecting portion connecting two adjacent spacers, a plurality of first recesses, and a plurality of second recesses; wherein a thickness of each of the at least one spacer is less than a thickness of each of the at least one connecting portion; each of the plurality of spacers having a seventh side and an eighth side opposite to the seventh side; each of the plurality of first recesses is on the seventh side of a corresponding one of the plurality of spacers; and each of the plurality of second recesses is on the eighth side of a corresponding one of the plurality of spacers.

In another aspect, the present invention provides a method of fabricating a backlight module described herein, comprising providing a light guide plate having a light emitting side and a rear side opposite to the light emitting side, and a plurality of lateral sides each of which connecting the light emitting side and the rear side, at least a first side of the plurality of lateral sides is a light incident side configured to receive light from a light source, and at least a second side of the plurality of lateral sides is not the light incident side; attaching a light barrier to the second side so that the light barrier is in contact with the second side for blocking light propagation and the light barrier is fixedly positioned relative to the light guide plate; and attaching a mold frame on a periphery of the light guide plate, the mold frame comprising at least one spacer; wherein the light barrier comprises at least one protruding support protruding away from an outer surface of the light barrier, the outer surface being on a side of the light barrier distal to the second side; and each of the at least one protruding support having a third side and a fourth side opposite to the third side, the third side being on a side of the fourth side proximal to the light emitting side, a normal distance between the third side and the rear side is less than a thickness of the light guide plate; and attaching the mold frame on the periphery of the light guide plate comprises disposing each of the at least one spacer on the third side of a corresponding one of at least one protruding support.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Figure 1:
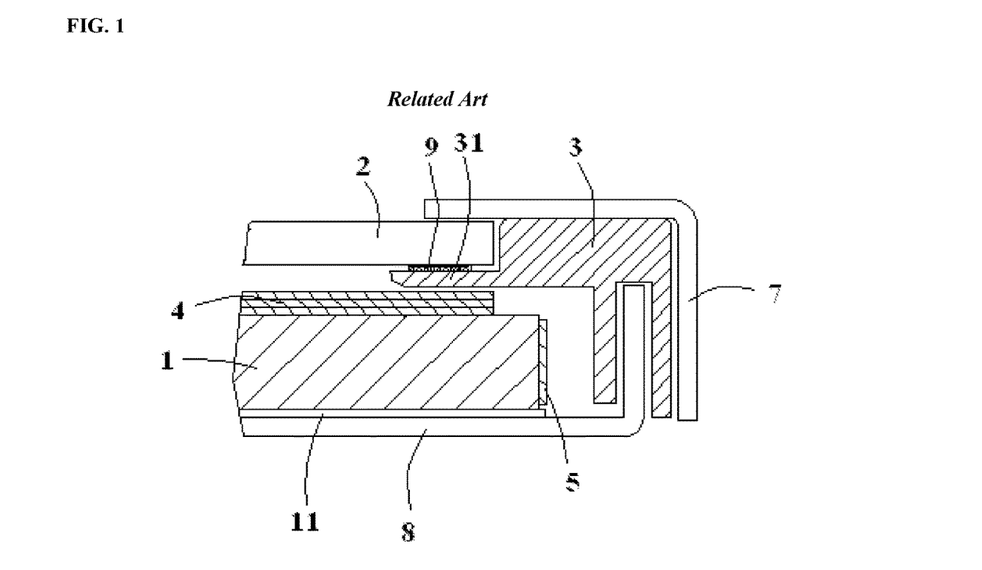
FIG. 1 is a schematic diagram illustrating the structure of a conventional liquid crystal display apparatus.

FIG. 1 is a schematic diagram illustrating the structure of a conventional liquid crystal display apparatus. Referring to FIG. 1, the conventional liquid crystal display apparatus includes a backlight module, a liquid crystal display panel 2, and a bezel 7. In the conventional backlight module, the light guide plate 1, the reflector sheet 11, and the optical film 4 are disposed within the enclosure of the backplate 8. The mold frame 3 is attached to the backplate 8, and includes a spacer 31 disposed on a light emitting side of the light guide plate 1 (or the optical film 4). When the backlight module, the liquid crystal display panel 2, and the bezel 7 are assembled together into the liquid crystal display apparatus, the spacer 31 is sandwiched between the liquid crystal display panel 2 and the light guide plate 1. The spacer 31 is adhered to the liquid crystal display panel 2 through a double-sided adhesive tape 9, thereby confining the relative position of the liquid crystal display panel 2 and the light guide plate 1. The backlight module further includes a light barrier 5 on a non-light incident side of the light guide plate 1. The light barrier 5 is a reflective sheet configured to prevent light leakage from the non-light incident side of the light guide plate 1.

Due to the limitations of molding techniques, the spacer 31 of the mold frame 3 in the conventional liquid crystal display apparatus cannot be possibly made ultrathin. Moreover, a relatively large thickness of the spacer 31 is required to maintain a certain strength of the structure. Accordingly, the total thickness of the conventional backlight module includes at least a thickness of the spacer 31, a thickness of the tight guide plate 1, and those of other components such as the reflector film, the backplate 8, and the optical film 4. The presence of the spacer 31 results in a relative large total thickness of the conventional liquid crystal display apparatus. It is difficult to miniaturize the liquid crystal display apparatus without re-design.

Accordingly, the present disclosure provides, inter alia, a backlight module and a liquid crystal display apparatus having the same that substantially obviate one or more of the problems due to limitations and disadvantages of the related art. In one aspect, the present disclosure provides a backlight module. In some embodiments, the backlight module includes a light guide plate having a light emitting side and a rear side opposite to the light emitting side, and a plurality of lateral sides each of which connecting the light emitting side and the rear side, at least a first side of the plurality of lateral sides is a light incident side for receiving light from a light source, and at least a second side of the plurality of lateral sides is not the light incident side; a light barrier attached to the second side and in contact with the second side for blocking light propagation; the light barrier fixedly positioned relative to the light guide plate; and a mold frame on a periphery of the light guide plate, the mold frame including at least one spacer. The light barrier includes at least one protruding support protruding away from an outer surface of the light barrier, the outer surface being on a side of the light barrier distal to the second side. Each of the at least one protruding support is configured to support one of the at least one spacer.

Figure 2:
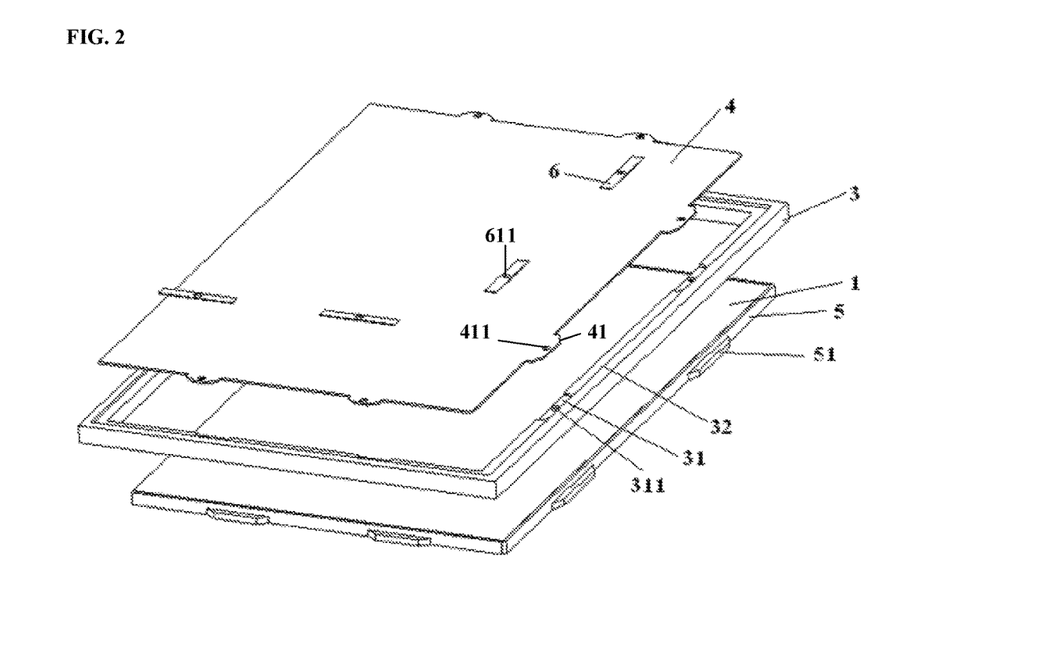
FIG. 2 is an exploded view of a backlight module in some embodiments according to the present disclosure.
Figure 3A:
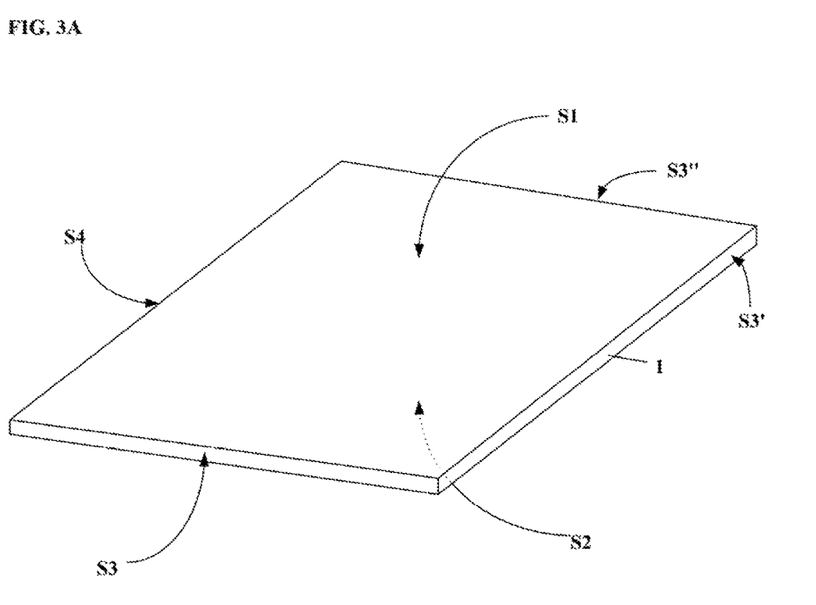
FIG. 3A is a schematic diagram illustrating the structure of a light guide plate in some embodiments according to the present disclosure.

FIG. 2 is an exploded view of a backlight module in some embodiments according to the present disclosure. Referring to FIG. 2, the backlight module in some embodiments includes a light guide plate 1, a light barrier 5, and a mold frame 3. FIG. 3A is a schematic diagram illustrating the structure of a light guide plate in some embodiments according to the present disclosure. Referring to FIG. 3A, the light guide plate 1 includes a light emitting side S1 and a rear side S2 opposite to the light emitting side S2, and a plurality of lateral sides (e.g., S3, S3', S3", and S4) each of which connecting the light emitting side S1 and the rear side S2. At least one side of the plurality of lateral sides is a light incident side for receiving light from one or more light sources (e.g., one or more LED tube, or a LED strip), i.e., light from the one or more light sources transmits from the one or more light sources into the light guide plate 1 through the light incident side. At least one side of the plurality of lateral sides is not a light incident side, i.e., light from the one or more light sources does not transmits front the one or more light sources into the light guide plate 1 through the lateral side that is not a light incident side. As shown in FIG. 3A, the lateral side S4 is a light incident side configured to receive light from a light source. The lateral sides S3, S3', S3" are not light incident sides. In one example, the one or more light source is disposed on the light incident side, and is absent on the lateral sides that are not light incident sides.

Figure 3B:
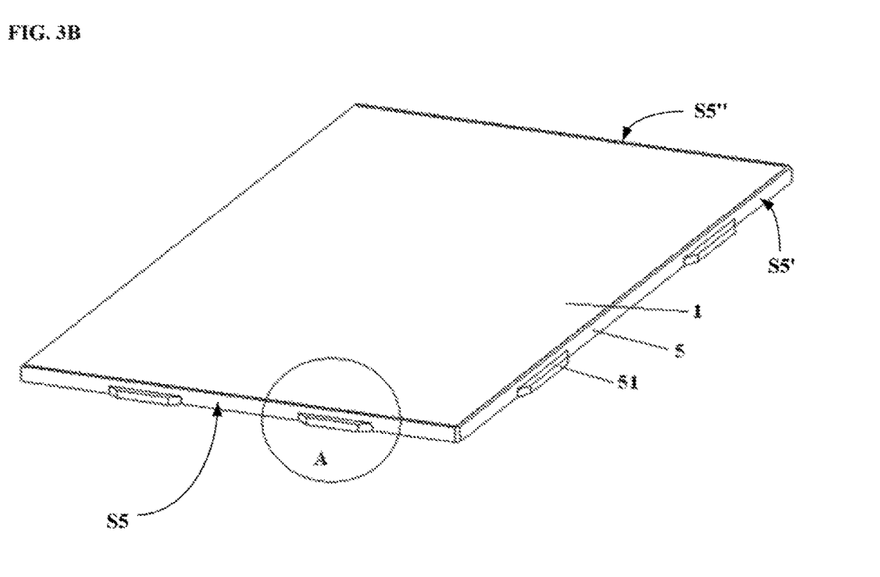
FIG. 3B is a schematic diagram illustrating the structure of a light barrier and a light guide plate assembled together in some embodiments according to the present disclosure.

FIG. 3B is a schematic diagram illustrating the structure of a light barrier and a light guide plate assembled together in some embodiments according to the present disclosure. Referring to FIG. 2, FIG. 3A, and FIG. 3B, the mold frame 3 is disposed on a periphery of the light guide plate 1. The mold frame 3 includes at least one spacer 31. The light barrier 5 is attached to the lateral sides that are not light incident sides for blacking light propagation, e.g., the light barrier 5 is attached to lateral sides S3, S3', and S3". The light barrier 5 is in contact with the lateral sides S3, S3', and S3", and is fixedly positioned relative to the light guide plate 1.

Referring to FIG. 2, FIG. 3A, and FIG. 3B, the light guide plate 1 in some embodiments has a rectangular shape. The top side of the light guide plate 1 in FIG. 3A is the light emitting side S1, and the bottom side of the light guide plate 1 in FIG. 3A is a rear side S2. Optionally, the backlight module further includes a reflector sheet on the rear side configured to reflect light back to the light guide plate 1. The reflector sheet (see, e.g., the reflector sheet 11 in FIG. 8 and FIG. 9) is disposed on a side of the light guide plate 1 distal to a liquid crystal display panel (see, e.g., the liquid crystal display panel 2 in FIG. 8 and FIG. 9). Optionally, the backlight module further includes a diffuser plate on the light emitting side S1.

Referring to FIG. 2 and FIG. 3B, the light barrier 5 in some embodiments includes at least one protruding support 51 protruding away from an outer surface of the light barrier 5. Optionally, the light barrier 5 includes a plurality of protruding supports 51 protruding away from an outer surface e.g., the outer surface S5, S5', and S5" in FIG. 3B) of the light barrier 5. As shown in FIG. 2 and FIG. 3B, the light barrier 5 includes two protruding supports 51 protruding away from an outer surface S5 of the light barrier 5 attached to the lateral side S3 of the light guide plate 1, and another two protruding supports 51 protruding away from an outer surface S5' of the light barrier 5 attached to the lateral side S3' of the light guide plate 1. The outer surface is on a side of the light barrier 5 distal to the lateral side that is not a light incident side of the light guide plate 1. For example, the outer surface S5 is on a side of the light barrier 5 distal to the lateral side S3 of the light guide plate 1, the outer surface S5' is on a side of the light barrier 5 distal to the lateral side S3' of the light guide plate 1, and the outer surface S5" is on a side of the light barrier 5 distal to the lateral side S3" of the light guide plate 1.

Figure 4:
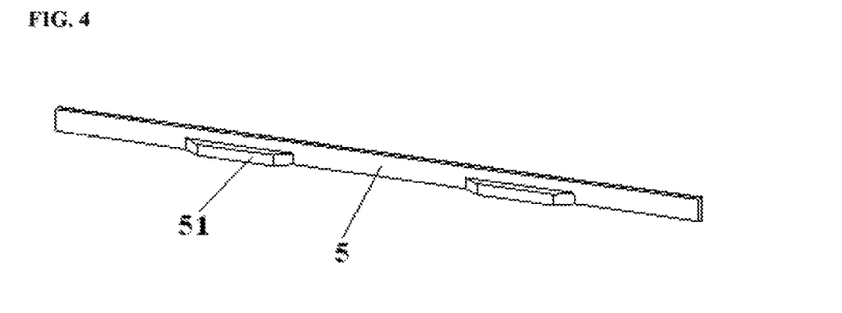
FIG. 4 is a schematic diagram illustrating the structure of a light barrier in some embodiments according to the present disclosure.
Figure 5:
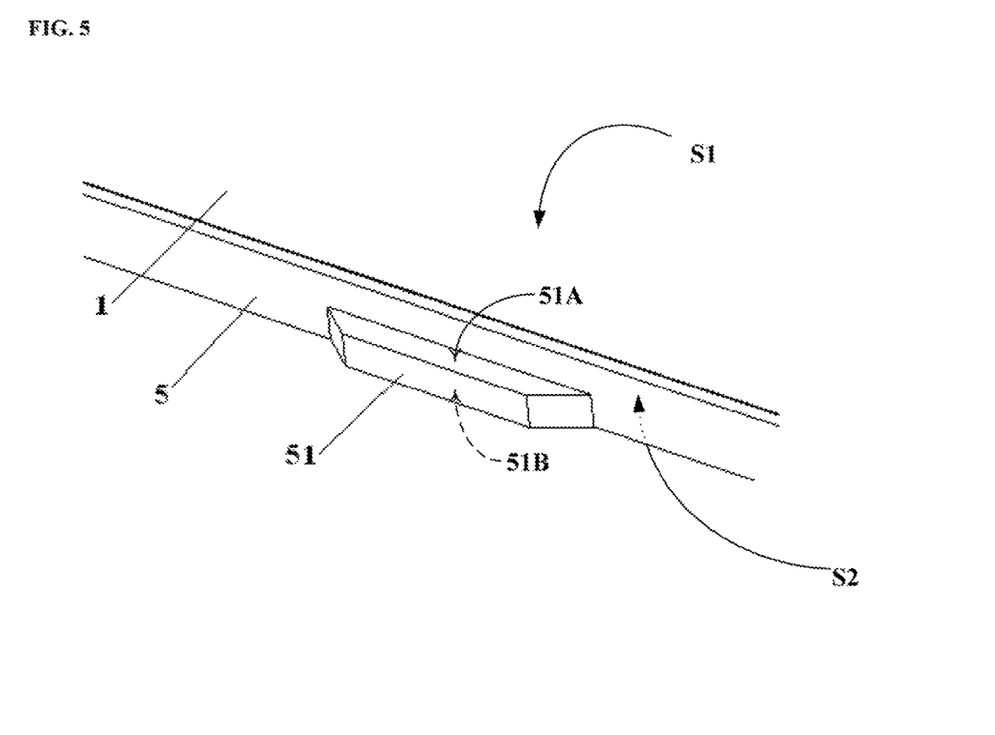
FIG. 5 is a zoom-in view of an area A in FIG. 3B.

FIG. 4 is a schematic diagram illustrating the structure of a light barrier in some embodiments according to the present disclosure. FIG. 5 is a zoom-in view of an area A in FIG. 3. Referring to FIG. 4 and FIG. 5, each of the at least one protruding support 51 has a top side 51A (e.g., the third side) and a bottom side 51B (e.g., the fourth side) opposite to the top side 51A. The top side 51A is on a side of the bottom side 51B proximal to the light emitting side S1 of the light guide plate 1. The top side 51A is configured to support the mold frame thereon. Specifically, the top side 51A is configured to support a spacer of the mold frame thereon. For example, the top side 51A is a supporting side configured to support the mold frame placed thereon.

The protruding support 51 has a thickness smaller than that of the light guide plate 1. Optionally, the normal distance between the top side 51A and the rear side S2 is less than the thickness of the light guide plate 1. Optionally, the normal distance between the top side 51A and the bottom side 51B is less than the thickness of the light guide plate 1.

In the present backlight module, the light barrier 5 is attached to the lateral sides of the light guide plate 1, and is in contact with the lateral sides of the light guide plate 1 to prevent light leakage from the lateral sides. Moreover, the light barrier 5 is fixedly positioned relative to the light guide plate 1, i.e., the light barrier 5 and the light guide plate 1 are configured so that they do not move relative to each other. Optionally, the light barrier 5 is securely attached to the light guide plate 1, e.g., by an adhesive.

In some embodiments, the light barrier 5 is a light barrier made of a relatively rigid material as compared to a light barrier in a conventional backlight module. Unlike the conventional light barrier having a sheet shape, the light barrier 5 in the present backlight module has a structure having at least one protruding support 51 protruding away from an outer surface (S5, S5', or S5") of the light harrier 5. An inner surface of the light bather 5 is in contact with the lateral sides (S3, S3', or S3") of the light guide plate 1. On the outer surface (S5, S5', or S5") of the light barrier 5, the light barrier 5 includes at least one protruding support 51 (e.g., a plurality of protruding supports 51), protruding away from the outer surface of the light barrier 5. The outer surface is on a side of the light barrier 5 distal to the lateral side of the light guide plate 1 that is not a light incident side. The top side 51A of the protruding support 51 is a supporting side configured to support a mold frame 3 disposed thereon. A normal distance between the top side 51A and the rear side S2 is less than a thickness of the light guide plate 1. As a result, the top side 51A of the protruding support 51 has a level lower than that of the light emitting side S1 of the light guide plate when the light barrier 5 and the light guide plate 1 are assembled together. For example, the thickness of the protruding support 51 is smaller than that of the lateral side of light guide plate 1 that is not a light incident side. By having this design, the spacer 31 of the mold frame 3 can be disposed in the space above the top side 51A of the protruding support 51. When the mold frame 3, the light barrier 5, and the light guide plate 1 are assembled together, the total thickness of the backlight module can be minimized.

Figure 6:
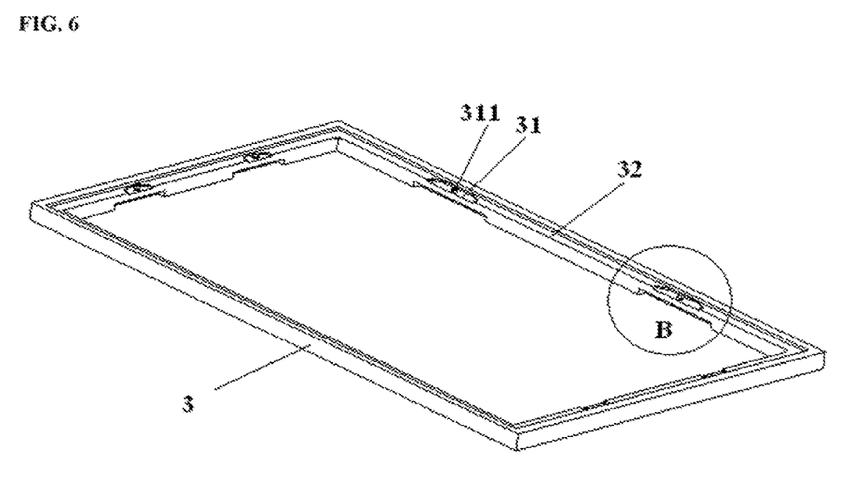
FIG. 6 is a schematic diagram illustrating the structure of a mold frame in some embodiments according to the present disclosure.
Figure 7:
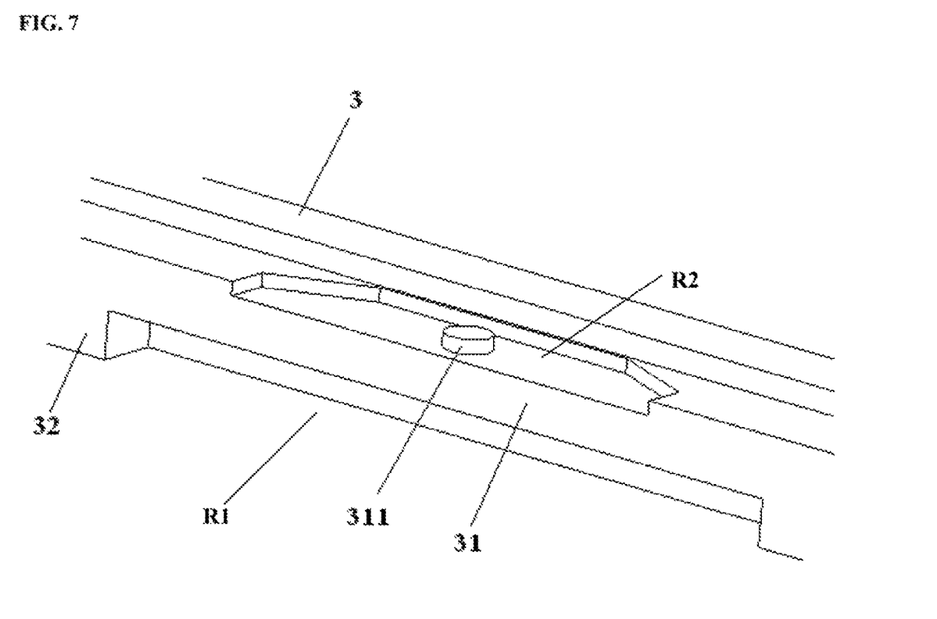
FIG. 7 is a zoom-in view of an area B in FIG. 6.

FIG. 6 is a schematic diagram illustrating the structure of a mold frame in some embodiments according to the present disclosure. FIG. 7 is a zoom-in view of an area B in FIG. 6. Referring to FIG. 6 and FIG. 7, the mold frame 3 in some embodiments includes at least one spacer 31, e.g., a plurality of spacers 31. Each spacer 31 is configured to be disposed on the top side 51A of the protruding support 51 of the light barrier 5. Thus, as compared to the spacer of a mold frame in a conventional backlight module, the spacer 31 in the present mold frame 3 is not disposed on the light emitting side S1 of the light guide plate 1. Rather, the spacer 31 is configured to be disposed on the top side 51A of the protruding support 51 of the light barrier 5, i.e., the spacer 31 is disposed adjacent to the light barrier 5, which is attached to the lateral sides of the light guide plate 1. As a result, a majority of the spacer 31 (or the entire spacer 31) is disposed at a level lower than or substantially equal to that of the light emitting side S1 of the light guide plate 1. By having this unique design, the total thickness of the backlight module is effectively minimized.

Optionally, the light barrier 5 is made of a metal material. Examples of appropriate metal materials for making the light barrier 5 include, but are not limited to, high-strength metal materials. Optionally, the metal materials for making the light barrier 5 have a high light reflectivity. The light barrier 5 made of a high reflectivity metal can effectively reflect light irradiated on the lateral side back to the light guide plate 1, enhancing light utilization efficiency. Examples of metal materials include aluminum and steel.

Optionally, the light barrier 5 is adhered onto the lateral side of the light guide plate 1 that is not a light incident side of the light guide plate 1. This provides a simple, low cost, and secure method for attaching the light barrier 5 onto the light guide plate 1. Optionally, the light barrier 5 may be attached to the light guide plate 1 using other methods. Optionally, the light barrier 5 is securely attached to the light guide plate 1 using one or more screws. Optionally, the light barrier 5 and the light guide plate respectively includes corresponding fasteners and fastener engagement portions. The corresponding fasteners and the fastener engagement portions engage with each other thereby securely attaching the light barrier 5 onto the lateral side of the light guide plate 1. Optionally, the light barrier 5 and the light guide plate respectively includes corresponding retaining clips and retaining openings, the corresponding retaining clips and the retaining openings engaged with each other thereby securely attaching the light barrier 5 onto the lateral side of the light guide plate 1.

Referring to FIG. 7, the mold frame 3 in some embodiments includes at least one first recess R1 (e.g., a plurality of first recesses R1) in areas corresponding to the at least one protruding support 51 when the light barrier 5 and the mold frame 3 are assembled together and the protruding support 51 is configured to provide support for the spacer 31 placed thereon. For example, the first recess R1 is located at a position underneath a spacer 31. Each of the at least one first recess R1 is configured to receive one of the at least one protruding support 51. Each of the at least one first recess R1 and a corresponding protruding support 51 are complementarily matching each other. When the backlight module is assembled together, the first recess R1 receives a protruding support 51, and the spacer 31 (which is above the first recess R1) is supported by the protruding support 51 received in the first recess R1.

Referring to FIG. 2, the backlight module in some embodiments further includes an optical film 4 on the light emitting side of the light guide plate 1. The optical film 4 includes at least one first insert hole 411 (e.g., a plurality of first insert holes 411) in a peripheral region of the optical film 4, configured to receive an insert 311 of the spacer 3. Referring to FIG. 2, FIG. 6, and FIG. 7, each of the at least one spacer 31 includes an insert 311 configured to be engaged with one of the at least one first insert hole 411 in the optical film 4.

In some embodiments, the optical film 4 includes a diffuser sheet. The optical film 3 is used to further process the light emitting out of the light emitting side S1 of the light guide plate 1. In the conventional backlight module, the optical film is typically secured in the backlight module by lateral retaining walls disposed on the backplate. In the present backlight module, as discussed above, a majority of the spacer 31 (or the entire spacer 31) is disposed at a level lower than or substantially equal to that of the light emitting side S1 of the light guide plate 1. By having this design, the spacer 31 may further include an insert 311 configured to be engaged with a first insert hole 411 in the optical film 4, thereby securing the optical film 4 without increasing the total thickness of the backlight module.

Referring to FIG. 2, the optical film in some embodiments further includes at least one positioning lug 41 (e.g., a plurality of positioning lugs 41). Each of the at least one first insert hole 411 extends through a corresponding one of the at least one positioning lug 41. Each of the at least one positioning lug 41 is configured to be disposed on a corresponding one of the at least one spacer 31. Referring to FIG. 7, the mold frame 3 in some embodiments includes at least one second recess R2 (e.g., a plurality of second recesses R2) in areas corresponding to the at least one positioning lug 41 when the optical film 4 and the mold frame 3 are assembled together and the spacer 31 is configured to provide support for the positioning lug 41 placed thereon. For example, the second recess R2 is located at a position above a spacer 31. Each of the at least one second recess R2 is configured to receive a corresponding one of the at least one positioning lug 41. Each of the at least one second recess R2 and a corresponding positioning lug 41 are complementarily matching each other. When the backlight module is assembled together, the second recess R2 receives a positioning lug 41, the spacer 31 (which is underneath the second recess R2) supports a positioning lug 41 received in the second recess R2, the first recess R1 receives a protruding support 51, and the spacer 31 (which is above the first recess R1) is supported by the protruding support 51 received in the first recess R1.

In some embodiments, a thickness of the first recess R1 is substantially the same as that of a protruding support 51. In some embodiments, a thickness of the second recess R2 is substantially the same as that of a positioning lug 41.

Figure 8:
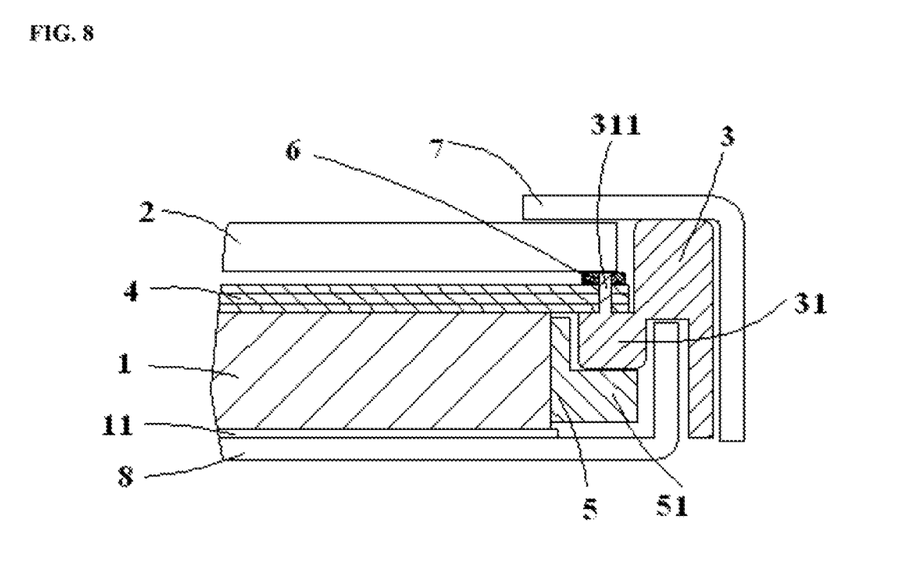
FIG. 8 is a cross-sectional view of a liquid crystal display apparatus illustrating the structure of a spacer in some embodiments according to the present disclosure.

FIG. 8 is a cross-sectional view of a liquid crystal display apparatus illustrating the structure of a spacer in some embodiments according to the present disclosure. Referring to FIG. 2 and FIG. 8, the liquid crystal display apparatus in some embodiments further includes at least one laminate sheet 6 (e.g., a plurality of laminate sheets 6) on a side of the optical film 4 distal to the light guide plate 1. Each of the at least one laminate sheet 6 includes a second insert hole 611, configured to receive an insert 311 of the spacer 3. The insert 311 of the spacer 3 is configured to be engaged with the second insert hole 611. For example, in an assembled backlight module having a light guide plate 1, a mold frame 3, a light barrier 5, and one or more laminates 6, each insert 311 is configured to be engaged with a first insert hole 411 and a second insert hole 611, e.g., the insert 311 extends through the first insert hole 411, and is inserted into the second insert hole 611. Optionally, the first insert hole 411 is a through-hole so that the insert 311 extends through the first insert hole 411. Optionally, the second insert hole 611 is not a through-hole so that the insert 311 is inserted into a portion of the laminate 6 along a thickness direction of the laminate 6. By inserting the insert 311 into the second insert hole 611, the laminate 6 can be securely attached in the backlight module. The laminate 6 possess a certain strength, and is configured to pressed down the peripheral region of the optical film 4 to prevent deformation (e.g., bubbling effect) of the optical film 4.

In some embodiments, a thickness of the insert 311 is substantially the same as or less than a total thickness of the positioning lug 41 and a laminate sheet 6. The laminate sheet can be made ultrathin.

In some embodiments, each of the at least one laminate sheet 6 is on a side of a corresponding one of the at least one positioning lug 41. Each of the at least one first insert hole R1 is aligned with a corresponding second insert hole R2 in one of the at least one laminate sheet 6. The insert 311 is configured to be engaged with each of the at least one first insert hole R1 and the corresponding second insert hole R2.

In some embodiments, each light barrier 5 includes a plurality of protruding support 51 spaced apart from each other, and each mold frame 3 includes a plurality of spacer 31 spaced apart from each other. Referring to FIG. 2, in order to prevent light leakage from lateral sides of the light guide plate 1 that are not light incident sides, the light barrier 5 is required to enclose the entire lateral sides that are not light incident sides. It is, however, not required to have protruding supports 51 over the entire length of the light barrier 5. To effectively provide support for the mold frame 3 placed thereon, it is sufficient to include a few protruding supports 51 spaced apart from each other along the length of the light barrier 5. Correspondingly, it is sufficient to include a few spacers 31 spaced apart from each other along the length of the mold frame 3 at positions corresponding to the protruding supports 51 on the light barrier 5. By having this design, the light guide plate 1 (and the liquid crystal display panel 2) can be secured in the backlight module, but at the same time is not overly constrained. This design still allows small movements of the light guide plate 1 (and the Liquid crystal display panel 2) such as expansions and retractions due to a temperature variation, obviating physical damages caused by overly tight physical constrain.

Figure 9:
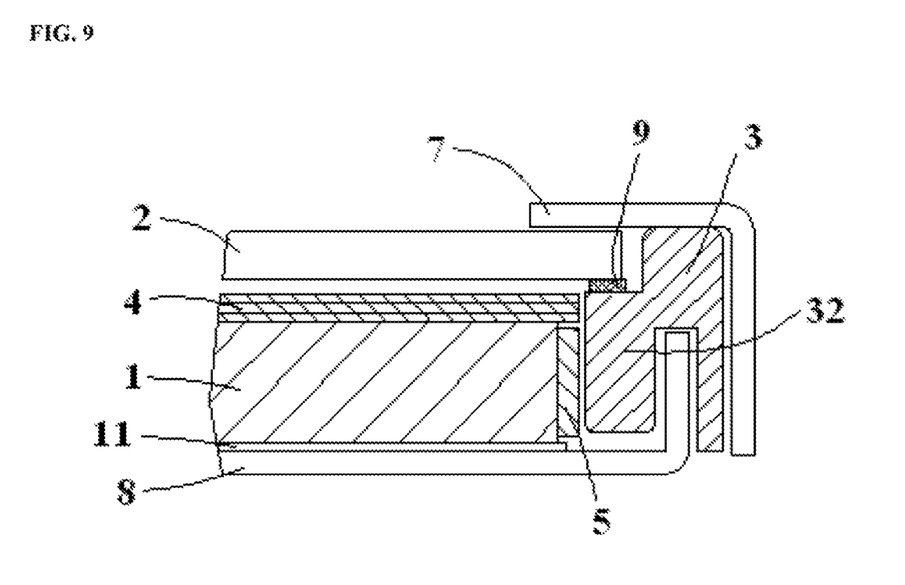
FIG. 9 is a cross-sectional view of a liquid crystal display apparatus illustrating the structure of a connecting portion in some embodiments according to the present disclosure.

FIG. 9 is a cross-sectional view of a liquid crystal display apparatus illustrating the structure of a connecting portion in some embodiments according to the present disclosure. Referring to FIG. 2 and FIG. 9, the mold frame 3 in some embodiments further includes a plurality of connecting portions 32, each of which connecting two adjacent spacers 31. Each of the plurality of connecting portions 32 has a top side and a bottom side opposite to the top side. The top side is on a side of the bottom side proximal to the light emitting side S1 of the light guide plate 1. The backlight module further includes a double-sided adhesive tape 9 on the top side of the connecting portion 32.

Referring to FIG. 2, FIG. 6, and FIG. 9, when the light barrier 5 includes a plurality of protruding supports 51 spaced apart from each other, the mold frame 3 correspondingly includes a plurality of spacers 31 spaced apart from each other. The plurality of spacers 31 are spaced apart from each other by a plurality of connecting portions 32, each connecting portion 32 connecting two adjacent spacers 31, to enhance the overall strength of the mold frame 3. The protruding support 51 is only disposed underneath the spacer 31, and not disposed underneath the connecting portion 32. Accordingly, the connecting portion 32 can be made of a larger thickness as compared to the spacer 31. For example, the first recess R1 in the mold frame 3 (as shown in FIG. 7) is only present at positions corresponding to the spacers 31, and is absent at positions corresponding to the connecting portions 32. In a liquid crystal display apparatus having the present backlight module, the top side of the connecting portion 32 is adjacent to the liquid crystal display panel 2. Thus, a double-sided adhesive tape 9 may be disposed on the top side of the connecting portion 32 to adhere the liquid crystal display panel 2 and the mold frame 3 together.

Referring to FIG. 8 and FIG. 9, the backlight module in some embodiments further includes a backplate 8 disposed on the rear side of the light guide plate 1. The backplate 8 is configured to be engaged with the mold frame 3. In one example, the backplate 8 and the mold frame 3 are securely attached to each other. For example, the backplate 8 and the mold frame 3 may respectively include a plurality of fasteners and a plurality of fastener engagement portions, the plurality of fasteners and the plurality of fastener engagement portions engaged with each other thereby securely attaching the backplate 8 and the mold frame 3 together.

Optionally, the backlight module further includes a reflector sheet 11. The backplate 8 encloses the reflector sheet 11 and, the light guide plate 1 in the backlight module, and secures the mold frame 3 in the backlight module.

Optionally, the backlight module further includes one or more light sources.

In another aspect, the present disclosure provides a liquid crystal display apparatus. Referring to FIG. 8 and FIG. 9, the liquid crystal display apparatus in some embodiments includes a backlight module described herein, and a liquid crystal display panel 2 disposed on a light emitting side of the light guide plate 1. Optionally, each of the at least one spacer 3 is disposed between the liquid crystal display panel 2 and one of the at least one protruding support 51.

Referring to FIG. 8, the light barrier 5 in the present liquid crystal display apparatus is attached to the lateral sides of the light guide plate 1 that are not light incident sides of the light guide plate 1. The light barrier 5 and the light guide plate 1 are fixedly positioned relative to each other, e.g., they formed an integrated structure. By having the spacer 31 of the mold frame 3 disposed between the protruding support 51 of the light barrier 5 and the liquid crystal display panel 2, the relative position of the liquid crystal display panel 2 and the light guide plate 1 can be confined. The normal distance between the top side of the protruding support 51 and the rear side of the light guide plate 1 is set to be less than the thickness of the light guide plate 1. By having this design, the spacer 31 of the mold frame 3 can be disposed in the space above the top side 51A of the protruding support 51. When the mold frame 3, the light barrier 5, and the light guide plate 1 are assembled together, the total thickness of the backlight module can be minimized.

Optionally, the liquid crystal display apparatus further includes a bezel 7. Optionally, the bezel 7 covers a peripheral region of the liquid crystal display panel. The bezel 7 and the backplate 8 together are configured to enclose the light guide plate 1, the reflector sheet 11, the optical film 4, the light barrier 5, the mold frame 3, and the liquid crystal display panel 2, forming an assembled display apparatus.

Examples of appropriate display apparatuses includes, but are not limited to, an electronic paper, a mobile phone, a tablet computer, a television, a monitor, a notebook computer, a digital album, a GPS, etc.

In another aspect, the present disclosure provides a light barrier for blocking light propagation on a lateral side of a light guide plate that is not a light incident side. In some embodiments, the light barrier includes at least one protruding support (e.g., a plurality of protruding supports) protruding away from an outer surface of the light barrier. A thickness of each of the at least one protruding support is less than a maximum thickness of the light barrier. Optionally, each of the at least one protruding support has a third side and a fourth side opposite to the third side, and the light barrier has a first edge and a second edge along the length direction. Optionally, the first edge and the second edge are substantially parallel to each other. The third side is on a side of the fourth side proximal to the first edge, and the fourth side is on a side of the third side proximal to the second edge. Optionally, a normal distance between the third side and the first edge is larger than zero.

In another aspect, the present disclosure provides a mold frame for assembling a light guide plate in a backlight module. In some embodiments, the mold frame includes a plurality of spacers and a plurality of connecting portions, each connecting portion connecting two adjacent spacers. Optionally, a thickness of each of the at least one spacer is less than a thickness of each of the at least one connecting portion. Optionally, the mold frame further includes a plurality of first recesses and a plurality of second recesses. Each of the plurality of spacers having a seventh side and an eighth side opposite to the seventh side. Each of the plurality of first recesses is on the seventh side of a corresponding one of the plurality of spacers. Each of the plurality of second recesses is on the eighth side of a corresponding one of the plurality of spacers.

In another aspect, the present disclosure provides a method of fabricating a backlight module. In some embodiments, the method includes providing a light guide plate having a light emitting side and a rear side opposite to the light emitting side, and a plurality of lateral sides each of which connecting the light emitting side and the rear side, at least a first side of the plurality of lateral sides is a light incident side configured to receive light from a light source, and at least a second side of the plurality of lateral sides is not the light incident side; attaching a light barrier to the second side so that the light barrier is in contact with the second side for blocking light propagation and the light barrier is fixedly positioned relative to the light guide plate; and attaching a mold frame on a periphery of the light guide plate, the mold frame including at least one spacer. The light barrier includes at least one protruding support protruding away from an outer surface oldie light barrier, the outer surface being on a side of the light barrier distal to the second side. Each of the at least one protruding support having a third side and a fourth side opposite to the third side, the third side being on a side of the fourth side proximal to the light emitting side, a normal distance between the third side and the rear side is less than a thickness of the light guide plate. Optionally, the step of attaching the mold frame on the periphery of the light guide plate includes disposing each of the at least one spacer on the third side of a corresponding one of at least one protruding support.

The foregoing description of the embodiments of the invention has been presented for purposes of illustration and description. It is not intended to be exhaustive or to limit the invention to the precise form or to exemplary embodiments disclosed. Accordingly, the foregoing, description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation an the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising:
   a light guide plate having a light emitting side and a rear side opposite to the light emitting side, and a plurality of lateral sides each of which connecting the light emitting side and the rear side, at least a first side of the plurality of lateral sides is a light incident side configured to receive light from a light source, and at least a second side of the plurality of lateral sides is not the light incident side;
   a light barrier attached to the second side and in contact with the second side for blocking light propagation, the light barrier fixedly positioned relative to the light guide plate;
   a mold frame on a periphery of the light guide plate, the mold frame comprising at least one spacer; and
   an optical film on the light emitting side of the light guide plate;
   wherein the light barrier comprises at least one protruding support protruding away from an outer surface of the light barrier, the outer surface being on a side of the light barrier distal to the second side;
   each of the at least one protruding support has a third side and a fourth side opposite to the third side, the third side being on a side of the fourth side proximal to the light emitting side;
   each of the at least one protruding support is configured to support a respective one of the at least one spacer on the third side, the third side being in direct contact with the respective one of the at least one spacer; and
   an orthographic projection of the optical film on a plane containing the rear side at least partially covers an orthographic projection of the third side on the plane containing the rear side.

2. The backlight module of claim 1, wherein the mold frame comprises at least one first recess in areas corresponding to the at least one protruding support, each of the at least one first recess configured to receive one of the at least one protruding support, each of the at least one first recess and a corresponding protruding support complementarily matching each other.

3. The backlight module of claim 2, wherein a thickness of each of the at least one first recess is substantially the same as that of a corresponding one of the at least one protruding support.

4. The backlight module of claim 1, wherein the optical film comprising at least one first insert hole in a peripheral region of the optical film;
   wherein each of the at least one spacer comprises an insert configured to be engaged with one of the at least one first insert hole; and
   the orthographic projection of the third side on the plane containing the rear side covers orthographic projections of the insert and the first insert hole on the plane containing the rear side.

5. The backlight module of claim 4, further comprising at least one laminate sheet on a side of the optical film distal to the light guide plate, each of the at least one laminate sheet comprising a second insert hole;
   wherein the insert is configured to be engaged with the second insert hole;
   an orthographic projection of the at least one laminate sheet on a plane containing the rear side at least partially covers an orthographic projection of the third side on the plane containing the rear side; and
   the orthographic projection of the third side on the plane containing the rear side covers orthographic projections of the second insert hole on the plane containing the rear side.

6. The backlight module of claim 4, wherein the optical film further comprising at least one positioning lug;
   each of the at least one first insert hole extends through one of the at least one positioning lug; and
   each of the at least one positioning lug is configured to be disposed on one of the at least one spacer.

7. The backlight module of claim 6, wherein the mold frame comprises at least one second recess in areas corresponding to the at least one positioning lug, each of the at least one second recess configured to receive one of the at least one positioning lug, each of the at least one second recess and a corresponding positioning lug complementarily matching each other.

8. The backlight module of claim 7, wherein a thickness of each of the at least one second recess is substantially the same as that of a corresponding one of the at least one positioning lug.

9. The backlight module of claim 6, further comprising at least one laminate sheet on a side of the optical film distal to the light guide plate, each of the at least one laminate sheet comprising a second insert hole;
   wherein each of the at least one laminate sheet is on a side of a corresponding one of the at least one positioning lug;
   each of the at least one first insert hole is aligned with a corresponding second insert hole in one of the at least one laminate sheet; and
   the insert is configured to be engaged with each of the at least one first insert hole and the corresponding second insert hole.

10. The backlight module of claim 1, wherein the at least one protruding support comprises a plurality of protruding supports spaced apart from each other; and
    the at least one spacer comprises a plurality of spacers spaced apart from each other.

11. The backlight module of claim 10, wherein the mold frame further comprises a plurality of connecting portions, each of which connecting two adjacent spacers, each of the plurality of connecting portions having a fifth side and a sixth side opposite to the fifth side, the fifth side being on a side of the sixth side proximal to the light emitting side; and
    the backlight module further comprises a double-sided adhesive tape on the fifth side.

12. The backlight module of claim 1, further comprising a backplate on the rear side and configured to be engaged with the mold frame.

13. The backlight module of claim 1, wherein the light barrier is adhered onto the second side.

14. The backlight module of claim 1, wherein the light barrier is made of a metal material.

15. A liquid crystal display apparatus, comprising the backlight module of claim 1; and
    a liquid crystal display panel on the light emitting side;
    wherein each of the at least one spacer is between the liquid crystal display panel and one of the at least one protruding support; and
    an orthographic projection of the liquid crystal display panel on a plane containing the rear side at least partially covers an orthographic projection of the third side on the plane containing the rear side.

16. The liquid crystal display apparatus of claim 15, further comprising a bezel configured to enclose the liquid crystal display panel and the backlight module.

17. The liquid crystal display apparatus of claim 16, wherein the bezel covers a peripheral region of the liquid crystal display panel.

18. A method of fabricating a backlight module of claim 1, comprising:
    providing a light guide plate having a light emitting side and a rear side opposite to the light emitting side, and a plurality of lateral sides each of which connecting the light emitting side and the rear side, at least a first side of the plurality of lateral sides is a light incident side configured to receive light from a light source, and at least a second side of the plurality of lateral sides is not the light incident side;
    attaching a light barrier to the second side so that the light barrier is in contact with the second side for blocking light propagation and the light barrier is fixedly positioned relative to the light guide plate;
    attaching a mold frame on a periphery of the light guide plate, the mold frame comprising at least one spacer; and
    attaching an optical film on the light emitting side of the light guide plate;
    wherein the light barrier comprises at least one protruding support protruding away from an outer surface of the light barrier, the outer surface being on a side of the light barrier distal to the second side;
    each of the at least one protruding support having a third side and a fourth side opposite to the third side, the third side being on a side of the fourth side proximal to the light emitting side, a normal distance between the third side and the rear side is less than a thickness of the light guide plate;
    attaching the mold frame on the periphery of the light guide plate comprises disposing each of the at least one spacer on the third side of a corresponding one of at least one protruding support;
    each of the at least one protruding support is configured to support a respective one of the at least one spacer on the third side, the third side being in direct contact with the respective one of the at least one spacer; and an orthographic projection of the optical film on a plane containing the rear side at least partially covers an orthographic projection of the third side on the plane containing the rear side.

\* \* \* \* \*